Patented Feb. 4, 1941

2,230,358

UNITED STATES PATENT OFFICE 2,230,358

PROCESS OF SIZING FABRICS

Martin W. Mason, Nutley, N. J., assignor to Pittsburgh Plate Glass Company, a corporation of Pennsylvania No Drawing. Application May 7, 1936, Serial No. 78,427

1 Claim. (Cl. 91—68)

This invention relates to the treatment of textile fabrics to cause them to be stiffened at ordinary temperatures and permanently resistant to the action of water, perspiration, and laundering solutions.

The primary object of my invention is to obtain a permanent sizing by applying a polymerized mixture of vinyl compounds to a fabric in such manner that the individual threads thereof are thoroughly impregnated with the vinyl compounds. A second object of the invention is to increase the tensile strength of the fabrics and prolong their useful life by the application thereto of a sizing medium.

Generally some form of sizing is applied to all fabrics to give them additional body and stiffness. The most common of these is starch. While this compound provides a cheap means for obtaining the desired properties in the treated materials, its effect is lost when the sized material is exposed to water. For example, contact with rain, laundering solutions, perspiration, etc., will destroy the effect of the size. Manifestly, each time a starch-sized fabric is washed it must be resized, thereby adding another operation to the laundering process. Furthermore, a soluble size does not protect the fabric and so prevent early deterioration thereof. Attempts have been made to replace the ordinary starch sizes with synthetic resin compounds, but they have not been entirely successful.

My invention consists in replacing the customary form of size with a waterproof, perspiration-proof, thermoplastic composition. One of the new sizing compounds is formed by polymerizing a mixture of monomeric vinyl chloride and vinyl acetate. The ratio of chloride to acetate may be varied within wide limits to alter the physical properties of the composition, but it has been found that a polymerized mixture of about 87 per cent of vinyl chloride and 13 per cent of vinyl acetate will produce a resin soluble in ordinary organic solvents and possessing the desired characteristics. Any of the known methods of polymerization may be used without impairing the quality of the final resin. The polymerized mixture of resins may be plasticized with any of the commonly used plasticizing agents, as, for example, diamylphthalate. The ratio of resin to plasticizer may also be varied according to the properties which it is desired to obtain.

The following example is of one specific composition which I have found to produce most satisfactory results. It is readily apparent, however, that many modifications may be made therein without departing from the spirit of my invention and accordingly I do not wish to be limited thereby:

| | Per cent |
|---|---|
| Vinylite H | 75 |
| Diamylphthalate | 25 |

Vinylite H is the trade name denoting a synthetic resin consisting of approximately 87 per cent of vinyl chloride and 13 per cent of vinyl acetate. Other vinylite compounds, such as Vinylite A, Vinylite C and Vinylite N, in which the ratio of the vinyl chloride to vinyl acetate is altered, may be used in a similar composition.

The plasticized polymerized vinylite resin is dissolved in either straight ketone solvents or aromatic hydrocarbons, or a mixture of both, in order that it may be more readily applied to the fabric. Best results have been obtained by mixing 85 per cent of a ketone, such as methylethyl ketone, dipropyl ketone, acetone, etc., with 15 per cent of an aromatic hydrocarbon of the benzol, toluene or xylene type.

The sizing solution containing from 40–60 per cent of solids is applied to the textile fabric by any of the known methods, such as spraying, roll-coating, squeegee or doctor blade. The fabric is then passed through a drying chamber in which the excess solvents are removed from the fabric. The drying chamber is employed solely for the purpose of rapidly driving off the solvents used in preparing the sizing solution. No change in the chemical nature of the sizing compound takes place in this particular operation. The dried fabric is cooled by passing it over cooling rolls, and is then wound upon suitable rolls. The fabric is now ready to be used in the preparation of those articles of manufacture requiring a permanently sized material.

It is to be understood that the sizing solution may carry a percentage of solids outside of those limits set forth in the preceding paragraph. The exact composition is, of course, dependent upon the characteristics which it is desired to obtain in the finished product. The method of application of said sizing solution may also determine the concentration of the solid ingredients. For example, application of the size through a dipping operation would permit the use of a solution containing as low as twelve (12%) per cent of solids. To the opposite extreme, the sizing solution may embody as much as ninety-five (95%) per cent of solids and its application effected by a roll-coating operation maintaining the size at an elevated temperature to insure proper impregnation of the textile fabric.

I am aware that polymerized vinyl acetate has been used in the prior art to treat special fabrics. Also a mixture of polymerized vinyl compounds has been used in coating solutions. My sizing solution, on the other hand, is to be regarded as a poly-polymer. That is, the monomeric vinyl chloride and vinyl acetate have been mixed before polymerization. I have found that textile fabrics treated with this new compound are very limp at temperatures slightly above normal room temperatures, that is, over 125 degrees F., the quality of stiffness imparted by the thermo-plastic size being lost. Manifestly this property will prolong the life of those fabrics when they are subjected to laundering operations because there will be no resistance offered against the mangles or other devices employed. At the same time, the softening temperature is not so low that the fabric will yield under ordinary conditions, while it is being worn or used and it will continue to present a fresh, trim appearance. It has also been found that this new compound is markedly superior in its resistance to soaps, alkalies, perspiration, water, etc. Accordingly, by the use of such compound permanent sizing of textile fabrics is insured and those fabrics will maintain their superior characteristics throughout normal life without requiring additional treatment to replace or restore the sizing.

What I claim is:

The method of permanently sizing textile fabrics which comprises applying thereto a solution consisting of from 40 to 60 per cent of a polymerized mixture of vinyl chloride and vinyl acetate containing approximately 25 per cent of diamylphthalate in from 40 to 60 per cent of a mixture of 85 parts by weight of methylethyl ketone and 15 parts by weight of benzol, driving off the excess solvent, and drying the fabric impregnated with the vinyl compounds.

MARTIN W. MASON.